Aug. 29, 1933.   W. N. GLAB   1,924,356
EMERGENCY VALVE
Filed Nov. 27, 1931
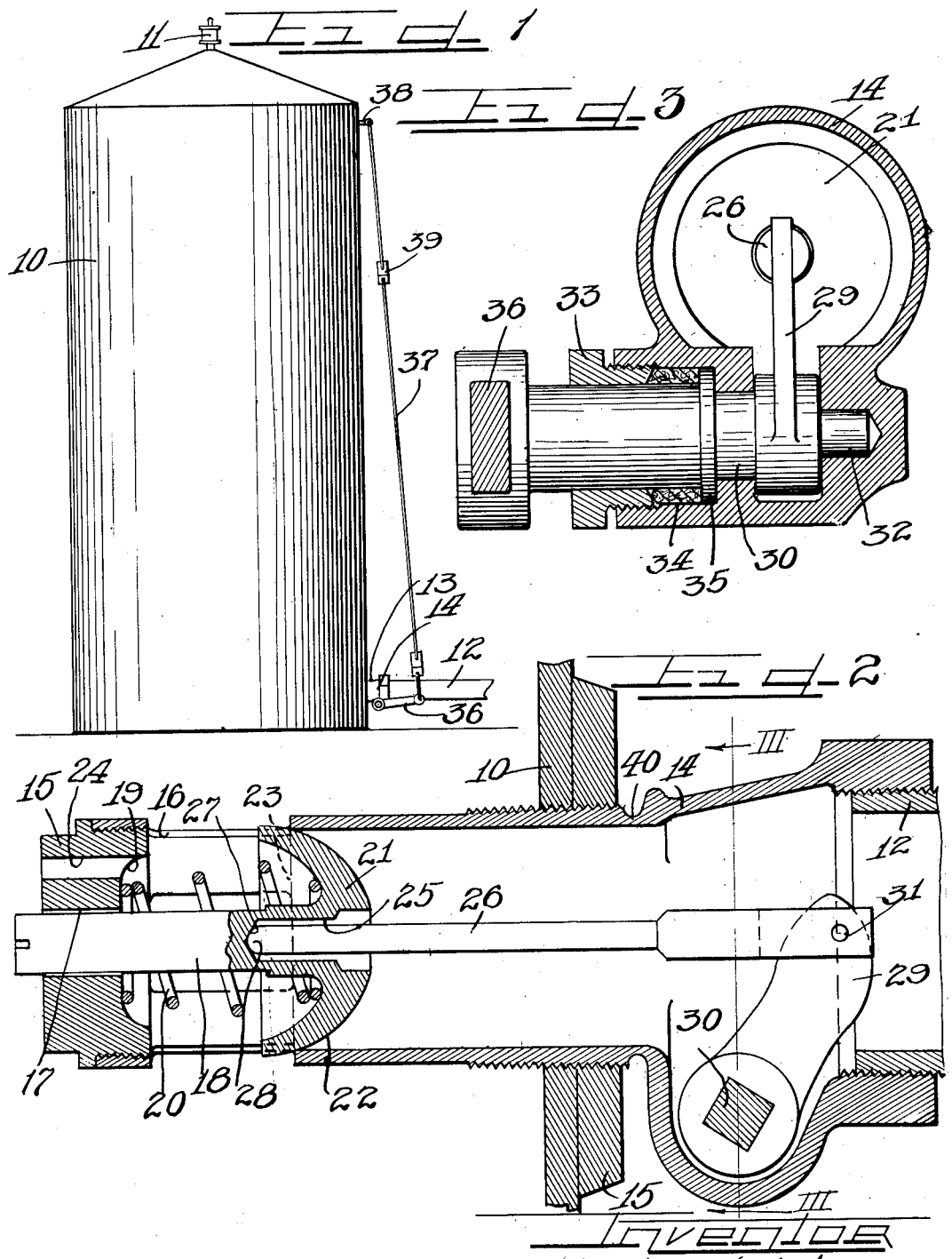
Inventor
William N. Glab.
by Charles Hill
Attys.

Patented Aug. 29, 1933

1,924,356

UNITED STATES PATENT OFFICE 1,924,356

EMERGENCY VALVE

William N. Glab, Dubuque, Iowa, assignor to Morrison Bros., Dubuque, Iowa, a corporation of Iowa Application November 27, 1931
Serial No. 577,507

2 Claims. (Cl. 137—162)

This invention relates in general to valves and more particularly to valves of the safety or emergency type, and although my invention is susceptible of many and various uses as will be evident to one skilled in the art, it has been found to be essentially adapted to prevent serious accidents resulting from fires and explosions in tanks that are used for the bulk storage of inflammable liquids such as oil and the like.

It is desirable in the case of valves for this purpose to have the valve elements within the tank and so arranged that the valve will close automatically upon the occurrence of a predetermined condition outside the tank, and cut off the possibility of oil escaping through the tank outlet. For example, in the past it has been the usual practice in order to attain this end to install a gravity or spring closed valve within the tank, this valve being normally held in open position by means of a wire, cable or system of rods which are carried through the tank to the outside, where connection is made to some form of thermal responsive device such as a fusible link. In the case of fire, this link is melted and permits the valve to close.

Since these tanks contain a volatile liquid, it is necessary in arrangements of the character just described in order to prevent the escape of vapors to provide a stuffing box for the rod or wire at the point where it passes through the tank, and in the case of the wire, suitable guide pulleys are provided to enable carrying the wire to a convenient point outside the tank. These arrangements have been found to be objectionable in that the present venting arrangements are inefficient when there are holes or openings through the tank; a condition which may result by virtue of the stuffing gland being too loose. Moreover, if the gland is tightened sufficiently to prevent escape of the liquid vapors, the proper operation of the valve within the tank becomes problematical. Obviously, the operation of an emergency device must be dependable and reliance upon a device which might or might not function would be disastrous.

The internally installed valves are further objectionable from the standpoint of installation and repair. Where these valves are to be installed in an existing tank or where repairs are to be made to an installed valve, the person doing the work must necessarily get inside the tank and in the case of a new installation, must go to the expense and trouble of installing the packing gland at the top of the tank. My invention is particularly advantageous in this regard, since the valve may be installed without the necessity of having to enter the tank and, moreover, there is no stuffing gland or the like that must be mounted in order to enable operation of the valve.

It has also been the practice in installing these valves within the tank to provide a nipple which extends through an opening in the tank and threadedly engages a supporting flange member which is secured to the tank. The valve proper in previous istallations has been secured within the tank to the inner end of this nipple and a pipe connection made to the outer end of the nipple. It has been found in installations of this nature that should too great a mechanical load be placed on this nipple, there is danger of stripping the threads with the result that there will be loss of oil, the stripping of the threads in no way affecting the operation of the valve.

To overcome these and other objections to the present type of valve and the manner in which the same is mounted, it is a primary object of this invention to provide a valve that may be installed in an existing tank without the necessity of having to enter the inside of the tank, and which does not necessitate the use of a stuffing box or the like in the tank to accommodate the valve operating mechanism.

It is a further object of this invention to provide an improved valve of the character described which may be installed from the outside of the tank, and in which the means for operating the valve is outside of the tank and does not have to pass through a stuffing box or the like in the tank, which would interfere with the proper operation of the tank venting system.

Another object of the present invention is to provide an improved valve of the character described which is so designed that should an excessive mechanical load be applied to the piping system where it leaves the tank, the valve will be closed to prevent discharge of liquid from the tank, and the construction of the valve is such that the liability of stripping the threads of the valve connection to the tank will be reduced to a minimum.

In accordance with the general features of this invention, it is proposed to provide a valve casing having a threaded portion intermediate its end so that when the valve is mounted in the tank, one end of the casing will be disposed on the inside of the tank and the other end outside of the tank. The inner end of the casing houses the valve member and seat for the valve member, and the outer end of the housing contains the valve operating mechanism.

The valve operating mechanism is held in such position as to maintain the valve in open position by means of a thermal responsive member which may comprise a wire or cable having a fusible link therein. The wire and cable having the fusible link are disposed wholly outside of the tank, thereby making it unnecessary to carry the cable over pulleys or the like and through a stuffing box in order to connect the cable to the valve as would be the case where the valve is wholly installed within the tank.

A further feature of the invention resides in the manner in which excessive mechanical loads are taken care of when applied to the valve. For this purpose the valve casing is constructed with a frangible portion adjacent the outer end of the threaded portion of the casing which engages the tank, and the connection between the operating means and the valve member is in the nature of a ball and socket joint so that the connection between the operating means and the valve member is not positive. Thus, when any extraordinary load comes upon the pipe line from the tank, the body of the valve will break at the frangible portion and allow the valve to close, thereby saving a possible loss of oil.

Other objects and features of this invention will more fully appear from the following detailed description taken in connection with the accompanying drawing which illustrate a single embodiment thereof, and in which Figure 1 is an elevational view showing a valve embodying the features of this invention installed in a storage tank;

Figure 2 is an enlarged fragmentary sectional view through the valve and tank to show the operative relationship between the component parts of the valve; and Figure 3 is an enlarged transverse sectional view with parts of the operating mechanism in elevation, taken substantially on line III—III of Figure 2.

As shown on the drawing:

In the illustrated embodiment of this invention, there is shown in Figure 1, a conventional storage tank 10 such as may be used for the bulk storage of volatile liquid such as fuel oil or the like, this tank being provided with the usual venting device 11 and a pipe connection 12 through which liquid may be supplied to the tank or carried away from the tank. The emergency valve, generally indicated by the numeral 13, is mounted at the entrance of the pipe 12 to the tank, the valve being supported in the tank and adapted for pipe connection as will subsequently be explained in more detail.

As shown in Figure 2, the valve comprises an elongated hollow casing 14 which is threaded in a flange member 15 and a side of the tank, the flange member being welded, riveted or otherwise secured to the tank. The inner end of the casing 14 is internally threaded to receive a cap member 15 and contains a plurality of openings 16 in the sides thereof for enabling fluid to pass from the tank into the casing. The cap 15 is provided with a central aperture 17 which forms a guide for a valve stem 18. The cap 15 is counterbored as shown at 19 to receive one end of a spring 20 which surrounds the stem 18 and bears against an integrally formed valve member 21 at its other end. The valve member 21 is preferably in the form of a semispherical shell having a seating surface 22 which engages a seat 23 formed by a shoulder on the casing 14. The cap 15 is also provided with a plurality of longitudinally extending apertures 24 which communicate with the counterbored portion 19 to enable the additional passage of oil through the cap into the counterbored portion so as to prevent sticking of the valve in open position, in which position the valve engages the cap 15.

Extending from the seating surface 22 of the valve member 21 is a socket 25 for receiving one end of a pusher rod 26 which is connected to the valve operating mechanism. The inner or closed end of the socket 25 is conically formed as shown at 27 and the end of the pusher rod 26 which engages this conical surface is rounded as shown at 28. It will also be observed that the pusher rod is of less diameter than the socket so that a universal or ball and socket joint is formed between the pusher rod and valve member 21, thereby enabling lateral movement of the pusher rod relative to the valve member 21.

The other end of the pusher rod 26 is forked to receive the end of an arm 29 which is fixedly secured against rotation on a shaft 30 mounted transversely in the end of the casing which is disposed outside of the tank. The outer end of the arm 29 is pivoted to the forked end of the pusher rod 26 by means of a pivot pin 31.

The shaft 30 is supported for rotation in the casing, one end of the shaft extending into a recess 32 and the other end of the shaft being supported in a bearing member 33 which surrounds the shaft and threadedly engages the casing. Oil is prevented from leaking along the shaft by a packing ring 34 which is pressed against an integrally formed shoulder 35 on the shaft by means of the member 33. Outside of the casing an arm 36 is mounted against rotation on the shaft 30, this arm being connected to a thermal responsive link, which is generally indicated at 37.

The thermal responsive link 37 comprises a sectional wire or cable and is connected at one end to the arm 36 and the other end to the tank as shown at 38. The sections of this wire are connected in end to end relationship by fusible elements 39 which are adapted to fuse at a predetermined temperature, thereby enabling the separation of the interconnected sections of the wire 37. For simplicity, I have shown the upper end of the thermal responsive link member 37 as being connected at 38 to the tank; however, it is obvious that it is not necessary to have this end of the member connected to the tank and that the same may be connected to any rigid member.

Referring to Figure 2, it will be noted that the casing 14 is provided with a contracted portion 40 adjacent the outer end of the thread connection of the casing to the tank. This contracted portion of the casing provides a frangible section so that, if at any time any extraordinary load is put upon the outer end of the valve casing, this frangible section will break and enable the valve member 21 to close, thereby preventing loss of oil or stripping of the thread connection of the valve to the tank.

Briefly, the operation of the valve of my invention is as follows:

The valve is installed in an opening of a storage tank 10 as shown in Figure 1, and is actuated to open position by moving the arm 36 so that the pusher rod 26 is moved longitudinally to force the valve member 21 against the pressure of spring 20, this action moving the valve member 21 to open position. The valve is held in open position by the thermal responsive link 37. Should a temperature outside the tank reach a high value, as would happen in the case of a fire, the fusible elements 39 will melt and release the arm 36. Since the pusher rod 26 is effective only in opening the valve, and by virtue of the fact that there is no positive connection between the valve and pusher rod when the arm 36 is released, the spring 20 will force the valve member 21 to closed position, thereby shutting off the supply of liquid to the pipe 12.

From the foregoing, it will be evident that my invention provides an emergency valve which may be installed in an existing tank without the necessity of having to enter the inside of the tank; which does not necessitate the use of a stuffing box or the like in the tank to enable operation of the valve by the valve operating mechanism; and in which the casing is provided with a frangible portion adapted to break when any extraordinary load is placed upon the pipe connection to the casing, thereby preventing stripping of the thread connection of the casing to the tank and permitting the valve to close and stop the flow of oil.

Now, it is of course to be understood that although I have described in detail the preferred embodiment of my invention, the invention is not to be thus limited but only insofar as defined by the scope and spirit of the appended claims.

I claim as my invention:

1. The combination with a tank having an outlet pipe extending therefrom of valve means in said pipe including a valve and seat therefor disposed within the confines of the tank, and actuating element for the valve arranged to open said valve and projecting out of the confines of the tank, said element and valve being so arranged that should said pipe break off at its junction with said tank said valve will automatically close irrespective of movement of the actuating element, and a thermal member disposed externally of the tank for controlling the operation of said element, and normally holding the valve in open position.

2. A valve of the character described comprising an elongated hollow casing adapted for connection at one end to a pipe, a cap threaded into the other end of the casing, said cap having a plurality of apertures terminating at one end in a counter-bored portion of the cap, a valve seat in the casing spaced from said cap, said casing having a side opening disposed between said seat and cap, a valve member cooperative with said seat having a central stem extending through one of said apertures, said valve member being curved to define a recess on the side towards said cap, a spring surrounding said stem with its ends extending into the counter-bored portion of the cap and the recess of the valve member respectively, and means to move the valve member to open position with its outer edge abutting the cap, in which position the cap and valve member cooperate to shield the stem and spring from interference with the flow of fluid through the valve.

WILLIAM N. GLAB.